(12) United States Patent
Kilgore et al.

(10) Patent No.: US 9,909,606 B2
(45) Date of Patent: Mar. 6, 2018

(54) TWO-PIECE PALLET FASTENER

(71) Applicant: A. Raymond Et Cie, Grenoble (FR)

(72) Inventors: Dorian Kilgore, Commerce Township, MI (US); Elio Evangelista, Macomb, MI (US); William Teller, Lake Orion, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 15/199,877

(22) Filed: Jun. 30, 2016

(65) Prior Publication Data
US 2018/0003208 A1  Jan. 4, 2018

(51) Int. Cl.
*B65D 19/00* (2006.01)
*F16B 19/08* (2006.01)
*B65D 19/38* (2006.01)

(52) U.S. Cl.
CPC .............. *F16B 19/08* (2013.01); *B65D 19/38* (2013.01); *B65D 2519/00273* (2013.01); *B65D 2519/00572* (2013.01)

(58) Field of Classification Search
CPC .......... B65D 2519/00069; B65D 2519/00104; B65D 2519/00034; B65D 2519/00552; B65D 2519/00562; B65D 2519/00567; B65D 2519/00263; B65D 2519/00572; B65D 2519/00273; B65D 19/08; Y10T 403/75; F16B 19/08
USPC ........ 108/901, 902, 56.1, 56.3, 57.25–57.27, 108/57.33, 51.11, 57.31
See application file for complete search history.

(56) References Cited

U.S. PATENT DOCUMENTS

| | | | |
|---|---|---|---|
| 4,007,516 A | | 2/1977 | Coules |
| 4,128,253 A | * | 12/1978 | Powers .............. B65D 19/0012 108/55.1 |
| 4,128,523 A | | 12/1978 | Powers |
| 4,267,781 A | | 5/1981 | Powers |
| 4,392,279 A | | 7/1983 | Schwager |
| 4,604,014 A | | 8/1986 | Frano |
| 4,782,763 A | | 11/1988 | Salloum |
| 4,896,612 A | | 1/1990 | Salloum |
| 4,927,287 A | * | 5/1990 | Ohkawa ................ F16B 21/086 24/297 |

(Continued)

FOREIGN PATENT DOCUMENTS

| | | | |
|---|---|---|---|
| GB | 1139976 A | | 1/1969 |
| JP | 2002096831 | * | 4/2002 |

*Primary Examiner* — Janet M Wilkens
(74) *Attorney, Agent, or Firm* — LeClairRyan

(57) ABSTRACT

A two-piece pallet fastener for securing a pallet element to a base pallet is disclosed. The fastener includes a sleeve having internal, male protrusions and a rivet having external, female threads. The sleeve is installed in a pallet base and the rivet is inserted through the part to be attached to the pallet base and into the sleeve. The sleeve includes a rivet-receiving end having an alignment feature and an anchoring end. The anchoring end includes flexible legs having external shoulders. The rivet includes a head and a shaft. The head includes an alignment feature. The shaft includes external, female threads and two or more axially-aligned longitudinal grooves. One or more detents are formed on the rivet for engagement with the interior surface of the sleeve. The detents are provided to produce a ratchet-type effect to assure that the rivet is locked into the sleeve.

23 Claims, 9 Drawing Sheets

(56) References Cited

U.S. PATENT DOCUMENTS

| | | | |
|---|---|---|---|
| 5,094,175 A * | 3/1992 | Christie | B65D 19/0069 |
| | | | 108/56.1 |
| 5,197,396 A | 3/1993 | Breezer et al. | |
| 5,337,681 A * | 8/1994 | Schrage | B65D 19/0071 |
| | | | 108/56.1 |
| 5,351,628 A | 10/1994 | Breezer et al. | |
| 5,413,052 A | 5/1995 | Breezer et al. | |
| 5,483,899 A * | 1/1996 | Christie | B65D 19/0073 |
| | | | 108/56.3 |
| 6,021,721 A * | 2/2000 | Rushton | B65D 19/0081 |
| | | | 108/56.1 |
| 6,280,116 B1 * | 8/2001 | Szu | F16B 19/1081 |
| | | | 248/222.11 |
| 6,540,461 B1 | 4/2003 | Hawang | |
| 7,219,609 B1 | 5/2007 | Utz et al. | |
| 7,555,879 B1 | 7/2009 | Utz et al. | |
| 9,038,546 B2 * | 5/2015 | Ten Bok | B65D 19/0048 |
| | | | 108/57.17 |
| 9,051,079 B2 * | 6/2015 | Kuo | B65D 19/0002 |
| 2002/0001513 A1 | 1/2002 | Tanaka | |
| 2002/0176762 A1 | 11/2002 | Moerke | |
| 2005/0285092 A1 | 12/2005 | Pesta | |
| 2007/0123137 A1 | 5/2007 | Marzetta | |
| 2008/0089742 A1 | 4/2008 | Hawang | |
| 2008/0236455 A1 * | 10/2008 | Naidu | B65D 19/0038 |
| | | | 108/56.1 |
| 2009/0211498 A1 | 8/2009 | Shea | |
| 2009/0220299 A1 * | 9/2009 | Hawang | F16B 13/0816 |
| | | | 403/408.1 |
| 2013/0017014 A1 * | 1/2013 | Wandelt | F16B 5/025 |
| | | | 403/343 |
| 2015/0251804 A1 | 9/2015 | Lin | |
| 2016/0039566 A1 * | 2/2016 | Lorenz | B65D 19/0016 |
| | | | 108/57.25 |

* cited by examiner

TWO-PIECE PALLET FASTENER

TECHNICAL FIELD

The disclosed inventive concept relates generally to fasteners for use in coupling two components together. More particularly, the disclosed inventive concept relates to a two-piece fastener for shipping pallets. The two-piece fastener includes a sleeve or nut having internal, male protrusions and a rivet or screw having external, female threads. Upon insertion of the rivet into the sleeve, the rivet is rotated, thereby pulling the rivet deeper into the sleeve. Upon full rotation, the male protrusions fit into detents formed within the rivet to prevent reverse rotation. The angular rotation provides clamp load once fully inserted and rotated.

BACKGROUND OF THE INVENTION

Successful domestic and international trade relies on the efficient and cost-effective shipment of both finished and unfinished goods of different sizes in various quantities. Many of these articles, both unfinished and finished, must be moved on flat transport structures such as pallets or skids that can be readily moved by heavy machinery such as a forklift, a pallet jack or a crane.

In order that shipping efficiency may be maximized at the lowest possible cost, the attachment of pallet components to one another must be undertaken quickly without compromising security or safety. Workers accordingly require a pallet fastening system that requires the least amount of effort to achieve complete fastening.

Conventional pallet fastening methods typically rely on either adhesive fastening or on mechanical fasteners such as nails, conventional screws or lag bolts. Adhesive fastening relies on permanent adhesives such as wood glue. While being effective at adhesion, the use of permanent adhesives makes disassembly very difficult and often results in damage to the pallet components.

Challenges faced by industries relying on mechanical fastening include different types of tools needed to install these fasteners. Nail fasteners result in cracked or damaged pallets. A further challenge is related to the disassembly of pallets once assembled, the challenge often including the removal of nails or the removal of threaded fasteners having stripped or damage fastener heads. Each of these challenges has the potential for increasing assembly cost to manufacturers because of added tooling as well as extra assembly and disassembly time.

Modern demands on the design and construction of pallet fasteners mean that new pallet fastener solutions need to contribute to ease of assembly as used in production (particularly in view of increasing automation) and provide excellent attachment strength, while maintaining high reliability and low production costs. Compliance with the need for standardization and the requirements of the shipping industry has proved challenging to current pallet fastener designs.

Accordingly, and as is the case in many industries, known approaches to attaching pallet components together are often undesirable and impractical. An improved methods for attaching two pallet components together remains wanting.

SUMMARY OF THE INVENTION

The disclosed inventive concept overcomes the problems associated with pallet fasteners by providing a simple and cost-effective response to the demands of the marketplace. Particularly, the pallet fastening system of the disclosed inventive concept includes a two-piece fastener that includes a sleeve or nut having internal, male protrusions and a rivet or screw having external, female threads. The sleeve is installed in a pallet base and the rivet is inserted through the part to be attached to the pallet base and into the sleeve.

The sleeve may be made of any of several materials, though a polymerized material is preferred. The sleeve includes internal, staggered male protrusions. The sleeve includes a rivet-receiving end having an alignment feature and an anchoring end. The anchoring end includes flexible legs having external shoulders.

The rivet may also be made of any of several materials, though a polymerized material is again preferred. The rivet includes a head and a shaft. The head includes an alignment feature. The shaft includes external, female threads and two or more axially-aligned longitudinal grooves.

One or more detents are formed on the rivet for engagement with the interior surface of the sleeve. The detents are provided to produce a ratchet-type effect to assure that the rivet is locked into the sleeve. If two detents are provided, the first detent establishes a preload and the second detent establishes a maximum clamping load. The detents can include flat, rounded, curved and/or curvilinear surfaces.

The base pallet includes a sleeve bore having a bored-out end for receiving the flexible legs of the sleeve. The pallet being attached to the base pallet includes a recess for receiving the rivet head.

Upon insertion of the rivet into the sleeve, the rivet is rotated ninety degrees at an angle relative to the centerline of the length, thereby pulling the rivet deeper into the sleeve. Upon full rotation, the male protrusions fit into detents formed within the rivet to prevent reverse rotation. The angular rotation provides clamp load once fully inserted and rotated.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

As those of ordinary skill in the art will understand, various features of the embodiments illustrated and described with reference to any one of the figures may be combined with features illustrated in one or more other figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

The figures illustrate a system for fastening one object to another and, in particular, provides a system for attaching an upper object to a base pallet. The upper object may be a component needing to be stabilized on the base pallet or may be an upper pallet. While primarily intended for use with shipping pallets, the two-piece fastener system of the disclosed inventive concept may be used for virtually any other application in which a practical and easy-to-use approach to fastening two components together is needed.

Figure 5:
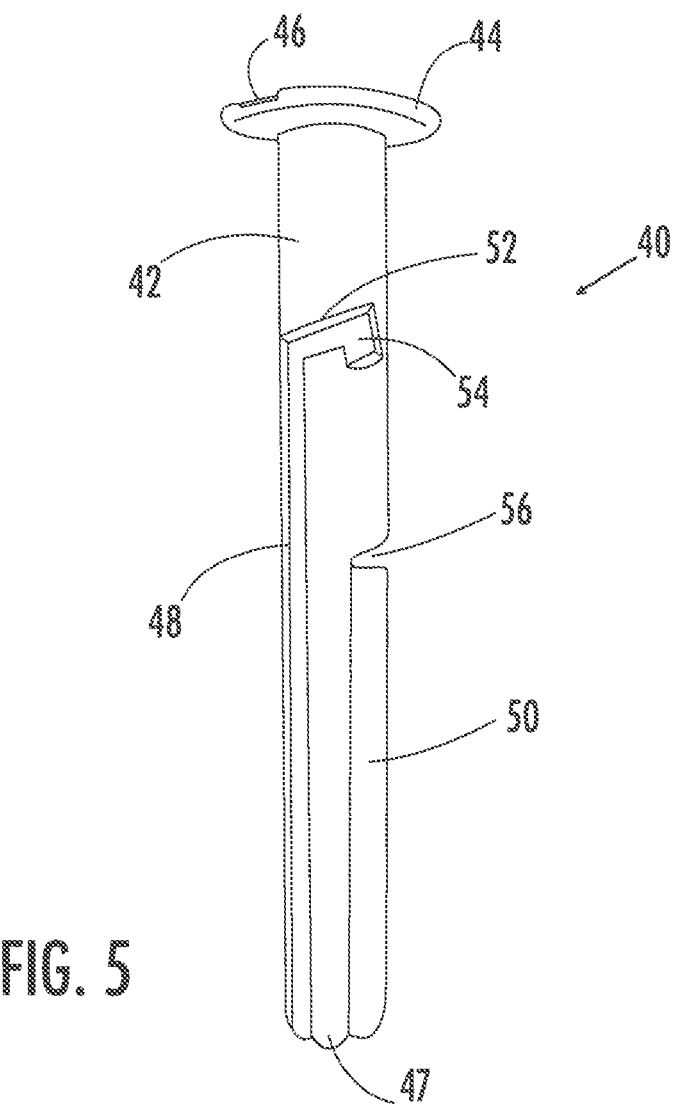
FIG. 5 is a side view of a rivet for use with the sleeve shown in FIG. 1 according to the disclosed inventive concept.
Figure 6:
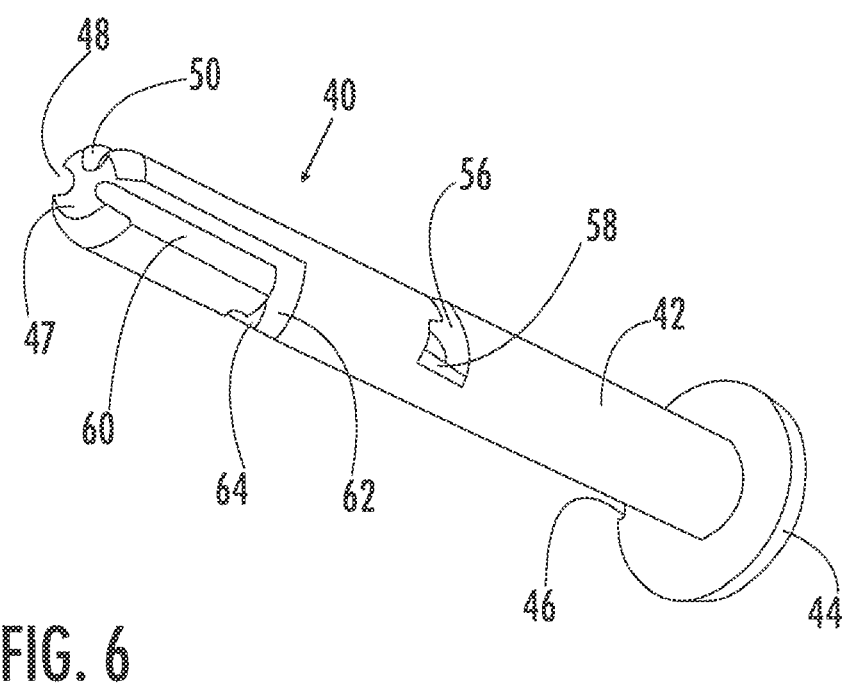
FIG. 6 is a perspective view of the rivet shown in FIG. 5.

In general, the two-piece fastener system of the disclosed inventive concept includes a sleeve or nut that is fitted into the base pallet and a rivet or screw that is fitted through the component being attached to the base pallet and into the sleeve. The sleeve is illustrated in FIGS. 1 through 4 and the rivet is illustrated in FIGS. 5 and 6. The two-piece fastener system is shown in use fastening an upper component to a base pallet in FIGS. 7 through 9.

Referring to FIGS. 1 through 4, a sleeve, generally illustrated as 10, is illustrated. It is to be understood that the illustrated configuration of the sleeve 10 is suggestive and is not intended as being limiting. Accordingly, and for example, the diameter and length of the sleeve 10 may be adapted as needed depending on the components being attached. The sleeve 10 may be composed of any of several materials including, for example and without limitation, a plastic.

The sleeve 10 includes a sleeve body 12 having a rivet-receiving end 14 and a sleeve-insertion end 16. The sleeve insertion end 16 includes a plurality of flexible locking legs 18, 18', 18" and 18'". It is to be understood that while four flexible locking legs are illustrated, a greater or lesser number of flexible locking legs may be employed. The flexible locking legs 18, 18', 18" and 18'" provide locking engagement with the base pallet as illustrated in FIG. 6 and as discussed below in relation thereto.

Each of the flexible locking legs 18, 18', 18" and 18'" includes a locking flange for engagement with the base pallet. Particularly, the flexible locking leg 18 includes a locking flange 20, the flexible locking leg 18' includes a locking flange 20', the flexible locking leg 18" includes a locking flange 20", and the flexible locking leg 18'" includes a locking flange 20'". While each flexible locking leg is illustrated as having a single locking flange, a greater number of flanges could be provided having different configurations, such as having a single flange split into two halves.

The sleeve 10 includes an axial bore that defines an interior wall 22. Formed on the interior wall 22 is a plurality of staggered teeth 24, 26 and 28. A greater or lesser number of teeth may be included. The teeth 24, 26 and 28 engage a like number of grooves formed on the rivet for engagement therewith. It is to be understood that while the teeth are illustrated as being formed on the interior wall 22 of the sleeve 10 and the grooves formed on the rivet, the grooves may be formed in the interior wall 22 and the teeth may be formed on the rivet.

Figure 1:
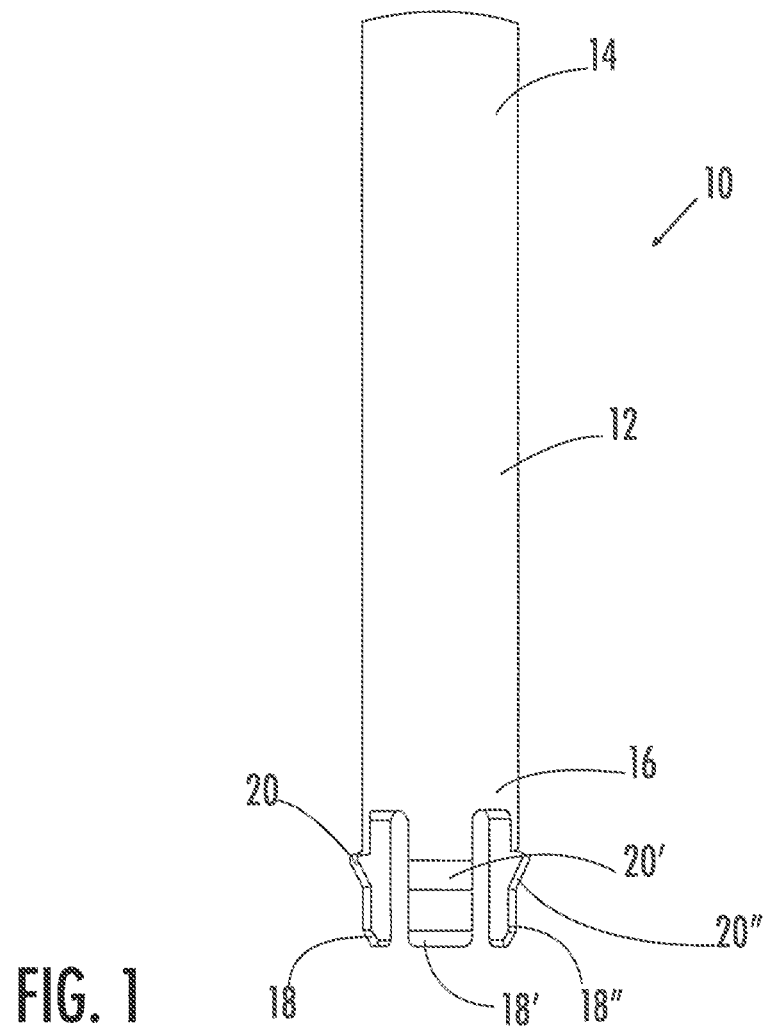
FIG. 1 is a side view of a sleeve according to the disclosed inventive concept.
Figure 2:
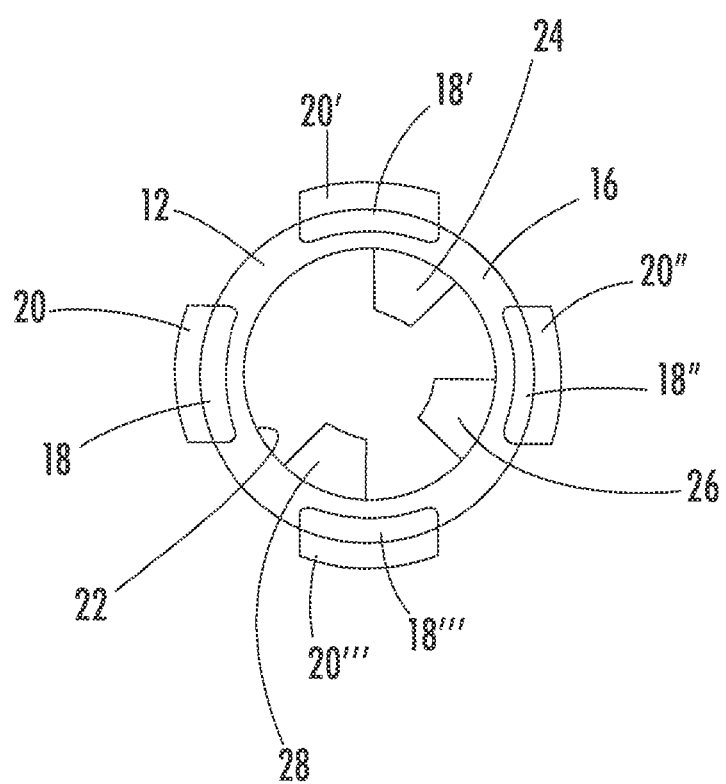
FIG. 2 is an end view of the sleeve shown in FIG. 1.
Figure 3:
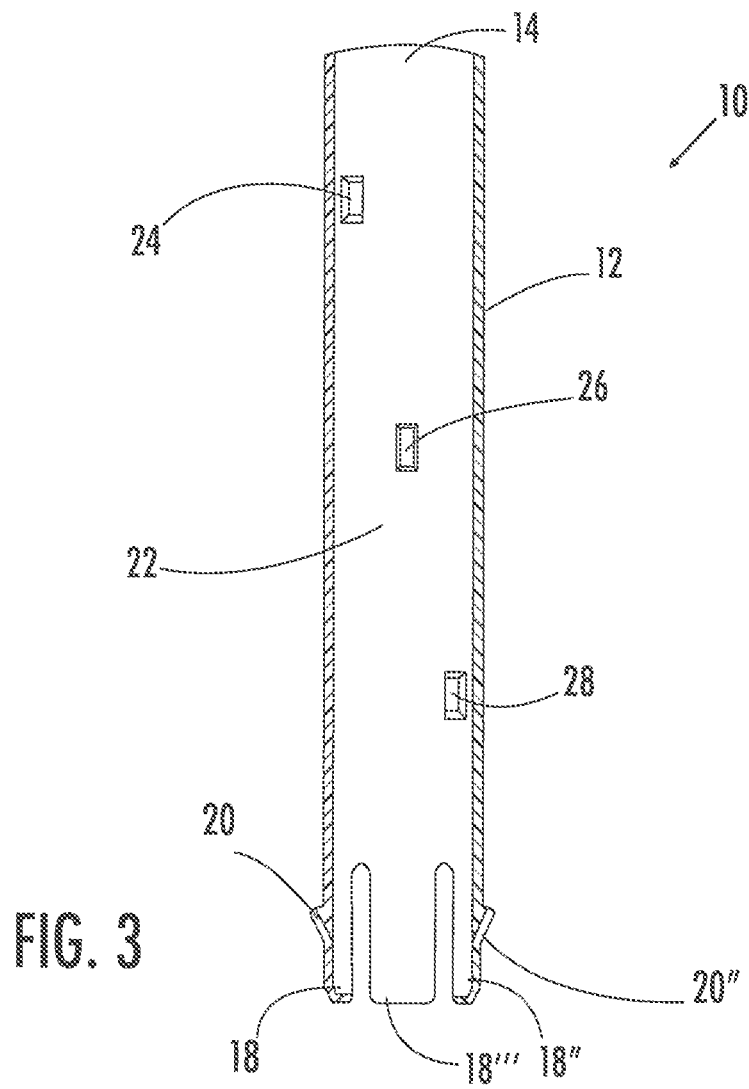
FIG. 3 is a sectional view of the sleeve shown in FIG. 1.
Figure 4:
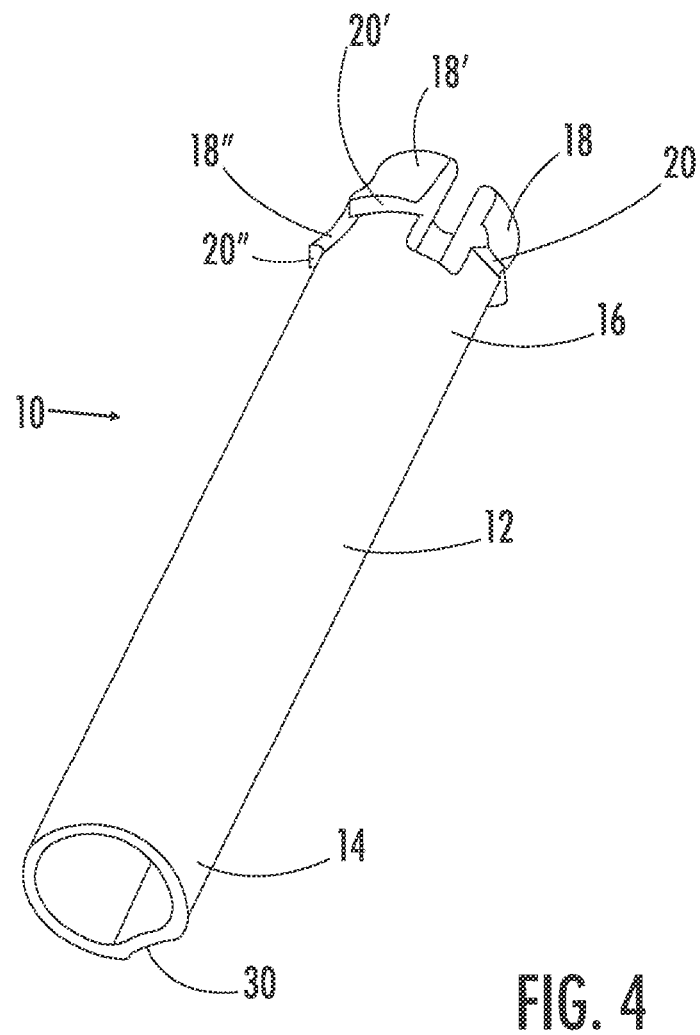
FIG. 4 is a perspective view of the sleeve shown in FIG. 1.

As illustrated in FIG. 3, the teeth 24, 26 and 28 are formed on the interior wall 22 in a staggered configuration along the length of the interior wall 22 such that tooth 24 is closest to the rivet-receiving end 14, the tooth 28 is closest to the rivet-insertion end 16, and the tooth 26 is positioned between the teeth 24 and 28. This arrangement is preferred but not required as alternate arrangements may be adapted. Regardless of the configuration, the teeth 24, 26 and 28 are strategically located on the interior wall 22 so as to provide an effective interlock with the grooves formed in the rivet as discussed below.

To assure a correct initial fit between the sleeve 10 and the rivet, an alignment feature 30 comprising a flat region is formed in the rivet-receiving end 14 of the body 12. The alignment feature 30 makes it possible for the rivet to be correctly aligned to assure a proper connection as described below.

The rivet, generally illustrated as 40, is shown in FIGS. 5 and 6 in which a side view and a perspective view of the rivet 40 are respectively set forth. It is to be understood that the illustrated configuration of the rivet 40 is suggestive and is not intended as being limiting. Accordingly, and for example, the diameter and length of the rivet 40 may be adapted as needed depending on the components being attached. The rivet 40 may be composed of any of several materials including, for example and without limitation, a plastic.

The rivet 40 includes a shaft 42 having a depth-limiting cap 44 formed at one end and a rounded insertion end 47 for insertion into the rivet-receiving end 14 of the sleeve 10. The depth-limiting cap 44 restricts the depth to which the shaft 42 may be inserted into the sleeve 10. Formed on one side of the depth-limiting cap 44 is an alignment feature 46. By aligning the alignment feature 46 of the cap 44 with the alignment feature 30 of the body 12 of the sleeve 10, the installer can be certain that the teeth of the sleeve and the grooves of the rivet are correctly lined up prior to insertion.

Externally formed along the long axis of the shaft 42 is a plurality of tooth receiving grooves to engage and interlock with the teeth 24, 26 and 28 formed on the interior wall 22 of the body 12 of the sleeve 10. As noted in the description of the sleeve 10 the axially aligned grooves may be formed in the interior wall 22 of the body 12 while the teeth may be formed on the shaft 42 of the rivet 30.

Two of the three axially aligned grooves are illustrated in FIG. 5. These grooves include a long axial groove 48 and an intermediate axial groove 50. The long axial groove 48 begins at the rounded insertion end 47 of the shaft 42 and ends relatively close to the cap 44 at an angled groove 52. The angled groove 52 terminates at detent 54 which is generally aligned with the long axis of the shaft 42.

The intermediate axial groove 50 also begins at the rounded insertion end 47 of the shaft 42 and ends at an angled groove 56 at a point approximately mid-way between the rounded insertion end 47 and the cap 44. As illustrated in FIG. 6, the angled groove 56 terminates at detent 58 that is generally aligned with the long axis of the shaft 42. The detents 54, 58 and 64 may be flat, rounded, curved or curvilinear or a combination thereof.

The third of the three axially aligned grooves is also illustrated in FIG. 6 in which a short axial groove 60 is shown. The short axial groove 60 begins at the rounded insertion end 47 of the shaft 42 and ends at a point approximately mid-way between the detent 58 and the rounded insertion end 47. The short axial groove 60 terminates at an angled groove 62 and the angled groove 62 terminates at detent 64. The angled grooves 52, 56 and 62 are defined as sections of a helix and thus provide mechanical advantage in locking the rivet 40 relative to the sleeve 10 as set forth below.

Figure 7:
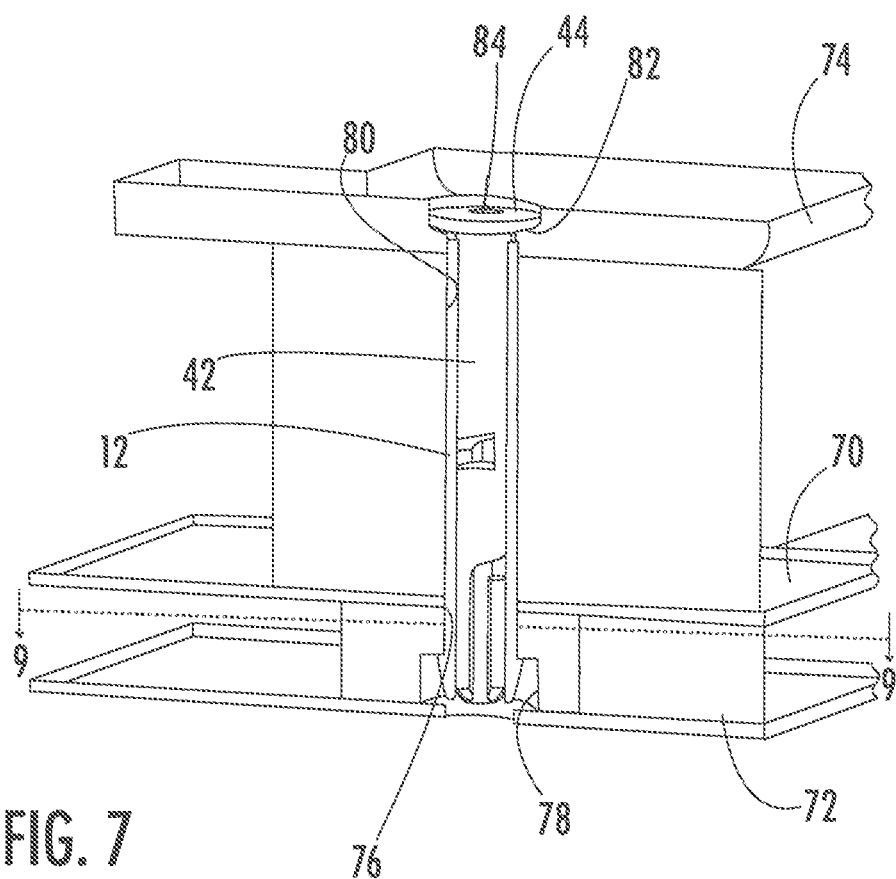
FIG. 7 is a sectional view showing the sleeve of FIG. 1 shown in position attaching a first pallet to a second pallet with the rivet of FIG. 5 locked therein.
Figure 8:
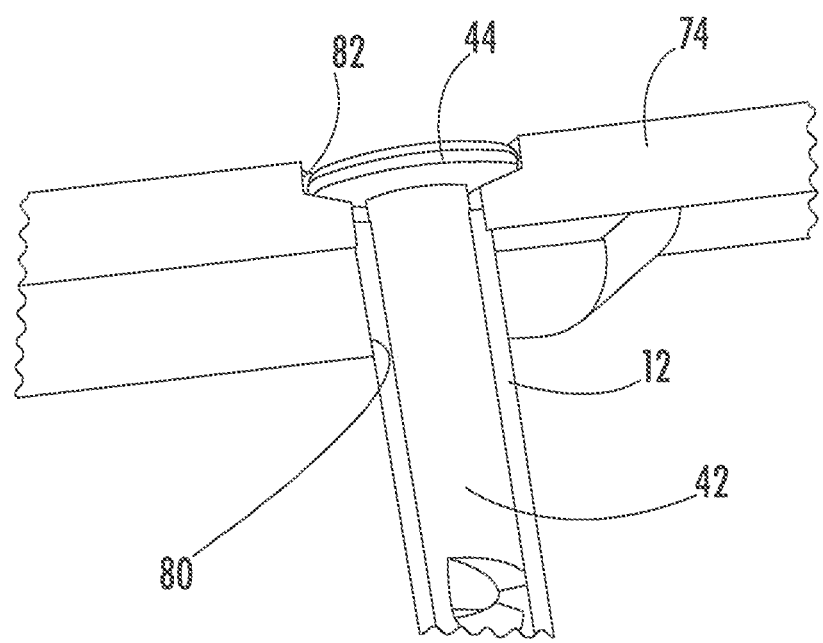
FIG. 8 is a detailed view of the head of the rivet in association with a portion of the first pallet locked into the sleeve according to the disclosed inventive concept.
Figure 9:
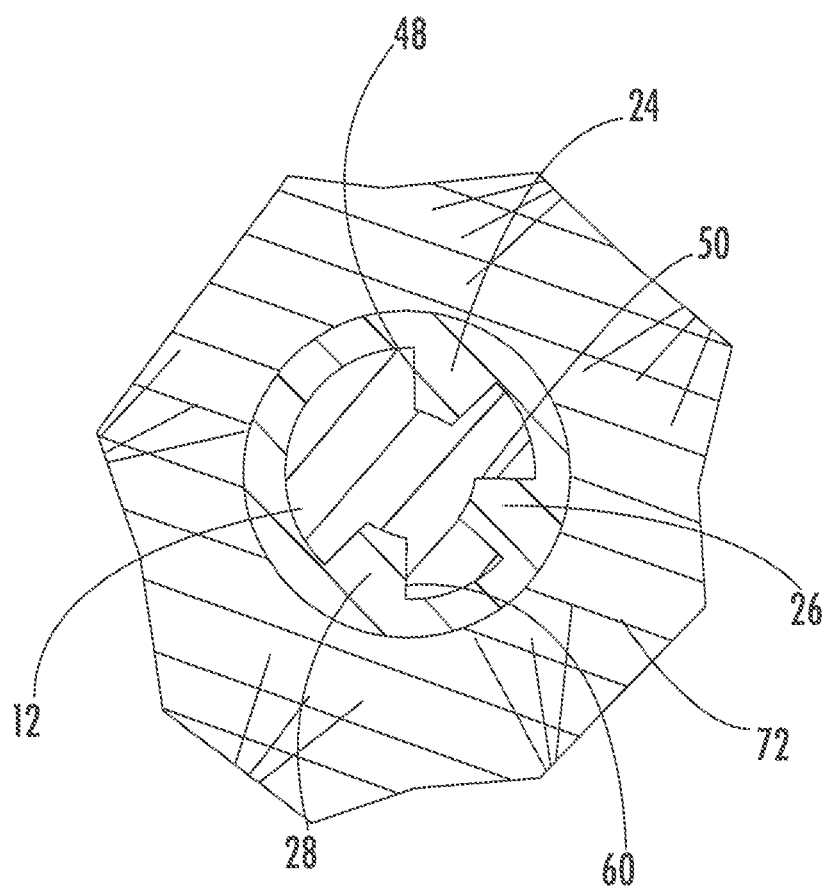
FIG. 9 is a sectional view taken along line 9-9 of FIG. 7 illustrating the rivet locked into the sleeve according to the disclosed inventive concept.

In use, the sleeve 10 is first inserted into the base pallet and the rivet 40 is then inserted through the part to be connected and into the sleeve 10. This arrangement is illustrated in FIGS. 7 through 9. Referring to FIG. 7, a pallet assembly 70 is shown comprising a pallet base 72 and an upper component being attached to the pallet base 72.

The upper component is an upper pallet 74. This being noted, it is to be understood that the two-piece fastener arrangement of the disclosed inventive concept may be used for a variety of pallet arrangements. Particularly the two-piece fastener arrangement is well-suited for use with a composite, high end shipping pallet intended for display, such as for medical and pharmaceutical purposes. For display purposes, it is necessary for the pallets to be aesthetically pleasing. It is also necessary for presentation purposes that the pallets be free of wood particles or other debris. Thus the pallets may be built from a combination of wood, high density foam, and one or more adhesives. Once prepared, the pallet is preferably coated with a compound available in various colors. After the pallet's useful life, it may be ground into reusable material. The two-piece fastener arrangement of the disclosed inventive concept is desired so that grinding equipment is not damaged as would be the case with conventional mechanical fasteners, such as metal fasteners. Serviceability of the pallet is also a requirement, which the disclosed inventive concept provides.

Sectional views of the rivet 40 inserted into and connected with the sleeve 10 are illustrated in FIGS. 7 and 8. Particularly, a bore comprising a lower bore portion 76 having a locking flange receptacle 78 bored out at its lowermost end and an upper bore portion 80. A countersunk bore 82 is formed in the upper pallet 74 into which is fitted the depth-limiting cap 44 once the rivet 40 is fully inserted into the sleeve 10.

Attachment of the upper pallet 74 (or upper component) to the pallet base 72 according to the disclosed inventive concept is achieved according to the following steps. Initially, the upper pallet 74 is moved over the pallet base 72 to its desired position. Thereafter, the lower bore portion 76, the locking flange receptacle 78, the upper bore portion 80 and the countersunk bore 82 are formed in the upper pallet 74 and the pallet base 72. Alternatively, the lower bore portion 76, the locking flange receptacle 78 and the upper bore portion 80 may be formed prior to assembly of the upper pallet 74 and the pallet base 72.

The sleeve 10 is then inserted into the upper bore portion 80. Because of their flexibility, upon insertion into the upper bore portion 80, the flexible locking legs 18, 18', 18" and 18'" flex slightly toward the center of the body 12 of the sleeve 10. Insertion of the sleeve 10 continues until the locking flanges 20, 20', 20" and 20'" engage the locking flange receptacle 78 as illustrated in FIG. 7. The locking of the locking flanges 20, 20', 20" and 20'" in this manner prevent movement of the sleeve 10 from the pallet base 72. The locked placement of the sleeve 10 is further secured upon insertion of the rivet 40 therein by which the rounded insertion end 47 of the rivet 40 prevents the flexible locking legs 18, 18', 18" and 18'" from being flexed inward as shown in FIG. 7.

With the sleeve 10 in its fully inserted position, the rivet 40 is then positioned over the rivet-receiving end 14 of the sleeve 10. As noted, the alignment feature 46 formed on the cap 44 of the rivet 40 is used to align the rivet 40 with the alignment feature 30 formed in the body 12 of the sleeve 10. Once proper alignment of the rivet 40 with respect to the sleeve 10, the rounded insertion end 47 of the rivet 40 is inserted into the rivet-receiving end 14 of the sleeve 10. To aid in the insertion of the rivet 40 into the sleeve 10, the cap 44 preferably includes a tool insertion cavity 84. The insertion cavity 84 may be of virtually any suitable configuration, including a slot to receive a screwdriver, a hex to receive a socket wrench, or a Torx® opening to receive a suitable driver. Proper alignment of the rivet 40 with respect to the sleeve 10 assures that the tooth 24 is slotted first into the long axial groove 48.

Continued insertion of the rivet 40 into the sleeve 10 results in the tooth 26 being slotted into the intermediate axial groove 50, while complete insertion of the rivet 40 into the sleeve 10 results in the tooth 28 being slotted into the short axial groove 60.

Insertion of the rivet 40 into the sleeve 10 continues until the cap 44 halts linear movement of the rivet 40 resulting in the initial setting of the teeth 24, 26 and 28 in their respective grooves 48, 50 and 60. A sectional view taken along line 9-9 of FIG. 7 illustrates the initial setting of the teeth 24, 26 and 28 relative to the grooves 48, 50 and 60 respectively.

Once fully inserted, the installer rotates the rivet 10, for example, by ninety degrees, whereby the tooth 24 engages the angled groove 52, the tooth 26 engages the angled groove 56, and the tooth 28 engages the angled groove 62. Because the grooves 52, 56 and 62 are at an angle relative to the long axis of the shaft 42 of the rivet 10, continued rotation draws the rivet 10 into the sleeve 40.

Final rotation of the rivet 40 in the sleeve 10 results in the tooth 24 engaging the detent 54, the tooth 26 engaging the detent 58, and the tooth 28 engaging the detent 64, thereby locking the rivet 40 in place within the sleeve 10. The detents 54, 58 and 64 operate in combination to produce a ratchet-type effect. In this locked position, reverse rotation of the rivet 40 relative to the sleeve 10 is prevented.

One skilled in the art will readily recognize from such discussion, and from the accompanying drawings and claims that various changes, modifications and variations can be made therein without departing from the true spirit and fair scope of the invention as defined by the following claims.

What is claimed is:

1. A fastening assembly adapted for securing together first and second members, the fastening assembly comprising:
    a sleeve, said sleeve being a substantially tubular member having an interior wall, said wall having teeth formed thereon, said teeth being staggered on said interior wall, said sleeve including an insertion end having a plurality of flexible locking legs, each of said locking legs including a locking flange;
    a rivet for at least partial insertion into said sleeve, said rivet having a shaft, said shaft having a long axis and having axial grooves formed along said long axis, the number of said axial grooves being equal to the number of said teeth, each of said grooves having an end;
    an angled groove formed at said end of each of said axial grooves, said angled groove being angled relative to said long axis of said shaft, each of said angled grooves having a detent end; and a detent formed at said detent end of each of said angled grooves.

2. The fastening assembly of claim 1, wherein said axial grooves have different lengths.

3. A fastening assembly adapted for securing together first and second members, the fastening assembly comprising:
a sleeve, said sleeve being a substantially tubular member having an interior wall, said wall having teeth formed thereon, said teeth being staggered on said interior wall;
a rivet for at least partial insertion into said sleeve, said rivet having a shaft, said shaft having a long axis and having axial grooves formed along said long axis, the number of said axial grooves being equal to the number of said teeth, each of said grooves having an end;
an angled groove formed at said end of each of said axial grooves, said angled groove being angled relative to said long axis of said shaft, each of said angled grooves having a detent end; and
a detent formed at said detent end of each of said angled grooves.

4. The fastening assembly of claim 3, wherein said sleeve includes an insertion end and wherein said insertion end includes a plurality of flexible locking legs.

5. The fastening assembly of claim 4, wherein each of said flexible locking legs includes a locking flange.

6. The fastening assembly of claim 5, wherein said flexible locking legs are displaceable from an initial installation position to a final locking position.

7. The fastening assembly of claim 6, wherein said flexible legs are maintained in said final locking position upon insertion of said rivet into said sleeve.

8. The fastening assembly of claim 3, wherein said rivet includes an insertion end and a cap end, said cap end including a depth-restricting cap.

9. The fastening assembly of claim 8, wherein said depth-restricting cap includes a sleeve alignment feature.

10. The fastening assembly of claim 3, wherein said sleeve has a rivet alignment feature.

11. The fastening assembly of claim 3, wherein said axial grooves have different lengths.

12. A construction system comprising:
a base pallet having a through bore having an end and an enlarged bore formed at said end of said through bore;
an upper pallet having a through bore;
a two-piece fastener comprising a sleeve and a rivet, said sleeve being inserted into at least one of said bores, said sleeve being a substantially tubular member having an interior wall, said wall having teeth formed thereon, said teeth being staggered on said interior wall and said rivet having a shaft, said shaft having a long axis and having axial grooves formed along said long axis, the number of said axial grooves being equal to the number of said teeth, each of said grooves having an end, an angled groove formed at said end of each of said axial grooves, said angled groove being angled relative to said long axis of said shaft, each of said angled grooves having a detent end, and a detent formed at said detent end of each of said angled grooves.

13. The construction system of claim 12, wherein said sleeve includes an insertion end and wherein said insertion end includes a plurality of flexible locking legs.

14. The construction system of claim 13, wherein each of said flexible locking legs includes a locking flange.

15. The construction system of claim 14, wherein said flexible locking legs are displaceable from an initial installation position to a final locking position.

16. The construction system of claim 15, wherein said flexible legs are maintained in said final locking position upon insertion of said rivet into said sleeve.

17. The construction system of claim 15, wherein said rivet includes an insertion end and a cap end, said cap end including a depth-restricting cap.

18. The construction system of claim 17, wherein said depth-restricting cap includes a sleeve alignment feature.

19. The construction system of claim 12, wherein said sleeve has a rivet alignment feature.

20. The construction system of claim 12, wherein said axial grooves have different lengths.

21. The construction system of claim 12, wherein said rivet is axially insertable into said sleeve for initial engagement in which said teeth engage said grooves for initial engagement of said rivet with said sleeve.

22. The construction system of claim 21, whereupon when maximum axial insertion of said rivet into said sleeve is achieved and said initial engagement is completed, said teeth are rotated into said angled grooves causing said rivet to be pulled deeper into said sleeve.

23. The construction system of claim 22, whereupon when maximum rotation of said teeth into said angled grooves is achieved, rotation is completed when said teeth engage said detents, whereby engagement of said teeth with said detents produces a ratcheting-type effect to lock said rivet into said sleeve thereby achieving final engagement of said rivet with said sleeve.

* * * * *